(12) United States Patent
Nabika et al.

(10) Patent No.: US 6,362,521 B1
(45) Date of Patent: Mar. 26, 2002

(54) SEMICONDUCTOR CERAMIC AND DEVICE USING THE SAME

(75) Inventors: Yasuhiro Nabika; Tetsukazu Okamoto, both of Omihachiman; Toshiharu Hirota, Hikone; Noriyuki Yamamoto, Shiga-ken, all of (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 09/427,997

(22) Filed: Oct. 27, 1999

(30) Foreign Application Priority Data

Nov. 11, 1998 (JP) .......................................... 10-320572

(51) Int. Cl.[7] .......................... H01L 23/053; H01L 23/12
(52) U.S. Cl. ........................................ 257/701; 257/703
(58) Field of Search ................................... 257/701, 703

(56) References Cited

U.S. PATENT DOCUMENTS

| | | | |
|---|---|---|---|
| 3,594,616 A | | 7/1971 | Nitta et al. .................. 257/698 |
| 4,816,072 A | * | 3/1989 | Harley et al. ........... 106/287.18 |
| 5,082,811 A | * | 1/1992 | Bruno ......................... 501/134 |
| 5,112,433 A | * | 5/1992 | Dawson et al. ............. 423/593 |
| 5,246,916 A | * | 9/1993 | Mooney et al. ............. 505/450 |
| 5,314,651 A | * | 5/1994 | Kulwicki .................... 264/620 |
| 5,434,410 A | | 7/1995 | Kulwicki ................. 250/338.3 |
| 5,635,436 A | * | 6/1997 | Fukuda et al. .............. 501/138 |
| 6,071,842 A | * | 6/2000 | Takahashi et al. .......... 501/137 |
| 6,160,472 A | * | 12/2000 | Arashi et al. .................. 338/21 |

FOREIGN PATENT DOCUMENTS

| | | |
|---|---|---|
| EP | 0974982 | 1/2000 |
| JP | 06279110 | 10/1994 |
| WO | WO 98/22411 | 5/1998 |

OTHER PUBLICATIONS

Database WPI, Section Ch, Week 198305 Derwent Publications Ltd., London GB; Class L03, AN 1983–11451K, XP002138781 & JP 58 001483B (Murata Mfg Co Ltd); Jan. 11 1983; Abstract.

* cited by examiner

Primary Examiner—Carl Whitehead, Jr.
Assistant Examiner—Jamie L. Brophy
(74) Attorney, Agent, or Firm—Ostrolenk, Faber, Gerb & Soffen, LLP

(57) ABSTRACT

A semiconductor ceramic composed of barium titanate, lead titanate, strontium titanate, and calcium titanate as primary components, includes samarium oxide as a semiconductor-forming agent in the primary components, and the average diameter of crystalline particles of the semiconductor ceramic is about 7 to 12 $\mu$m. The semiconductor ceramic has a resistivity at room temperature not greater than 3.5 $\Omega$cm, a withstand voltage not less than 50 V/mm, a resistance-temperature coefficient $\alpha_{10\text{-}100}$ not less than 9%/°C. and also has less variability of resistance.

20 Claims, 1 Drawing Sheet

SEMICONDUCTOR CERAMIC AND DEVICE USING THE SAME

BACKGROUND OF THE INVENTION

1. Field of the Invention

The present invention relates to semiconductor ceramics. More particularly, the present invention relates to a semiconductor ceramic having a positive resistance-temperature characteristic, and to a semiconductor ceramic device using the same.

2. Description of the Related Art

Hitherto, a semiconductor device having a positive resistance-thermal characteristic, which abruptly increases resistance above the Curie temperature (hereinafter referred to as a PTC characteristic), is used to protect circuits from overcurrents, and is used as a degaussing part for color TVs. A semiconductor ceramic primarily composed of barium titanate is generally used for the semiconductor device because it has low resistivity and high withstand voltage.

However, the conventional barium titanate type semiconductor ceramic has a problem in that the withstand voltage decreases when the resistivity is further lowered. Therefore, a semiconductor ceramic which has an improved withstand voltage is obtained by substituting Pb and Sr for a part of the Ba in barium titanate, and by incorporating calcium titanate.

A barium titanate type semiconductor ceramic composition having various further improved properties for a positive characteristic thermistor is described in Japanese Unexamined Patent Application Publication No. 3-54165. The composition mentioned above includes 45 to 87 mol percent of $BaTiO_3$, 3 to 20 mol percent of $PbTiO_3$, 5 to 20 mol percent of $SrTiO_3$ and 5 to 15 mol percent of $CaTiO_3$ as primary components, which are individually prepared by a liquid phase process, and additives of 0.2 to 0.5 mol percent of a semiconductor-forming agent, 0.02 to 0.08 mol percent of Mn and 0 to 0.45 mol percent of $SiO_2$, on the basis of the primary components. This ceramic composition described above has a resistivity at room temperature of 3 to 10 Ωcm and a withstand voltage of 10 to 200 V/mm. In the above unexamined patent, Sb, Y and La are described as semiconductor-forming agents in the Examples.

In Japanese Unexamined Patent Application Publication No. 3-88770, a barium titanate type semiconductor ceramic composition for a positive characteristic thermistor is described. The composition includes 45 to 85 mol percent of $BaTiO_3$, 1 to 20 mol percent of $PbTiO_3$, 1 to 20 mol percent of SrTiO and 5 to 20 mol percent of $CaTiO_3$ as primary components, which are individually prepared by an oxalic acid process, and additives of 0.1 to 0.3 mol percent of a semiconductor-forming agent, 0.006 to 0.025 mol percent of Mn and 0.1 to 1 mol percent of $SiO_2$ on the basis of the primary components. The ceramic composition has a resistivity at room temperature not greater than 8 Ωcm (4 to 8 Ωcm), a resistance-temperature coefficient $\alpha_{10\text{-}100}$ not less than 9%/°C. and a withstand voltage not less than 60 V/mm. In the unexamined patent, La, Sb and Nb are described as semiconductor-forming agents in Examples.

However, the semiconductor ceramics disclosed in the patents described above have the following problems.

1. When La, Sb or Nb is used as a semiconductor-forming agent, the variability of resistance becomes larger, although resistivity at room temperature can be lowered.

2. When Y is used as a semiconductor-forming agent, the resistivity at room temperature cannot be lowered.

3. Resistivity at room temperature is greater than 3.5 Ωcm, i.e., resistivity cannot be sufficiently lowered.

SUMMARY OF THE INVENTION

Accordingly, it is an object of the present invention to provide a semiconductor ceramic which has a resistivity at room temperature not greater than 3.5 Ωcm, a withstand voltage not less than 50 V/mm, a resistance-temperature coefficient $\alpha_{10\text{-}100}$ not less than 9%/°C. and a reduced variability of resistance.

It is another object of the present invention to provide a semiconductor ceramic device using the semiconductor ceramic described above, which has a resistivity at room temperature not greater than 3.5 Ωcm, a withstand voltage not less than 50 V/mm, a resistance-temperature coefficient $\alpha_{10\text{-}100}$ not less than 9%/°C. and a reduced variability of resistance.

To these ends, there is provided in one aspect of the present invention, a semiconductor ceramic including barium titanate, lead titanate, strontium titanate, and calcium titanate as primary components, and samarium oxide as the semiconductor-forming agent, wherein the average diameter of crystalline particles of the semiconductor ceramic is 7 to 12 μm.

Semiconductor ceramic in accordance with the composition and the average diameter of crystalline particles described above has a resistivity at room temperature not greater than 3.5 Ωcm, a withstand voltage not less than 50 V/mm, a resistance-temperature coefficient $\alpha_{10\text{-}100}$ not less than 9%/°C. and a reduced variability of resistance.

The semiconductor ceramic composition preferably includes 30 to 97 mol percent of barium titanate, about 1 to 50 mol percent of lead titanate, about 1 to 30 mol percent of strontium titanate and about 1 to 25 mol percent of calcium titanate as primary components, the total of the components being 100 mol percent. In addition, the additives preferably include a Sm-containing compound in an amount of about 0.1 to 0.3 mol elemental Sm, a Mn-containing compound in an amount of about 0.01 to 0.03 mol elemental Mn and a Si-containing compound in an amount of 0 to about 2.0 mol elemental Si, on the basis of 100 mols of the primary components.

The composition of the primary components described above may further lower the resistivity at room temperature.

In another aspect of the present invention, a semiconductor ceramic device has electrodes formed on two main surfaces of the semiconductor ceramic described above.

By the configuration as described above, the semiconductor ceramic device has a resistivity at room temperature not greater than 3.5 Ωcm, a withstand voltage not less than 50 V/mm, a resistance-temperature coefficient $\alpha_{10\text{-}100}$ not less than 9%/°C. and a reduced variability of resistance.

BRIEF DESCRIPTION OF THE DRAWING

The figure is a schematic perspective view of a semiconductor ceramic device according to the present invention.

DESCRIPTION OF THE PREFERRED EMBODIMENTS

Figure 1:
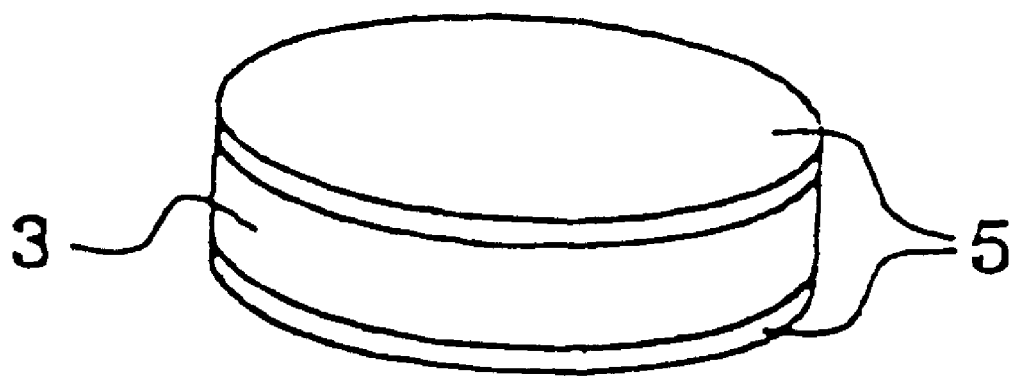

A semiconductor ceramic according to the present invention includes barium titanate, lead titanate, strontium titanate and calcium titanate as primary components, and samarium oxide as a semiconductor-forming agent, i.e., the samarium oxide is a doping agent. The average diameter of crystalline particles of the semiconductor ceramic is about 7 to 12 μm.

A semiconductor ceramic device according to the present invention has electrodes formed on the semiconductor ceramic.

The method of synthesis of the barium titanate used in the semiconductor ceramic is not limited in the present invention. The method may be, for example, a solid-phase reaction or a liquid-phase reaction, i.e., a solution reaction.

The primary components are preferably about 30 to 97 mol percent of barium titanate, about 1 to 50 mol percent of lead titanate, about 1 to 30 mol percent of strontium titanate and about 1 to 25 mol percent of calcium titanate, the total being 100 mol percent. This composition may further lower the resistivity at room temperature.

The preferable samarium oxide content of about 0.1 to 0.3 mol percent elemental Sm of the primary components enables the resistance-temperature coefficient α to become higher.

Manganese oxide, silicon oxide or the like may be added as a sintering agent, if necessary, to the semiconductor ceramic described above.

The semiconductor ceramic device according to the present invention is not limited in shape; however, a disc is generally formed. Electronic units using the semiconductor ceramic device may be semiconductor ceramics molded with resins having lead terminals connected to electrodes and semiconductor ceramics disposed in a housing provided with lead terminals.

Next, the present invention will be explained in detail with reference to the Examples.

EXAMPLES

Example 1

A manufacturing process for the semiconductor ceramic and a manufacturing process for the semiconductor ceramic device according to the present invention will be explained.

$BaCO_3$, $TiO_2$, $PbO$, $SrCO_3$ and $CaCO_3$ to be used for the primary components, the semiconductor-forming agent $Sm_2O_3$, and the other additives $MnCO_3$ (an agent for improving resistance-temperature coefficient) and $SiO_2$ (a sintering agent), were respectively prepared first as starting raw materials and then a mixture was obtained by blending these materials at predetermined ratios followed by wet mixing thereof. Subsequently, the obtained mixture was drained, dried and calcined at 1150° C., so that a clinker was obtained. After pulverizing the obtained clinker, a granulated product was obtained by granulation of the clinker with addition of a binder. The granulated product was shaped by monoaxial press molding into a 0.5 mm-thick disc with a diameter of 11.0 mm, and then was sintered at 1350° C. in a $N_2$ atmosphere. Subsequently, a semiconductor ceramic according to the present invention was obtained by re-oxidation treatment at 1150° C.

A SEM picture of a surface of the obtained semiconductor ceramic was taken, and the average diameter of the crystalline particles was determined by a section method.

Next, a semiconductor ceramic device 1 was obtained with In-Ga electrodes 5 bonded by baking on two main surfaces of a semiconductor ceramic 3 as shown in the figure.

The resistivity at room temperature (Ωcm), the withstand voltage (V/mm), and the resistance-temperature coefficient ($α_{10-100}$) of the obtained semiconductor ceramic device were measured. The resistance-temperature coefficient is $$α_{10-100}=[ln(ρ_2/ρ_1)/(T_2-T_1)]×100(\%/°C.)$$

where $ρ_1$ is 10 times $ρ_{25}$ in resistivity, $T_1$ is temperature when resistivity is $ρ_1$, and $ρ_2$ is 100 times $ρ_{25}$ in resistivity and $T_2$ is temperature when resistivity is $ρ_2$. The measurement results are shown in Table 1. The content (mol percent) of the semiconductor-forming agent and the additives in Table 1 are on the basis of the primary components. The symbol* in any Table herein indicates the value is outside the range of the present invention.

As shown in Table 1, when the average diameter of the crystalline particles is about 7 to 12 μm, the resistivity at room temperature is not greater than 3.5 Ωcm, the withstand voltage is not less than 50 V/mm and the resistance-temperature coefficient $α_{10-100}$ is not less than 9%/°C.

The average diameter of the crystalline particles was limited to about 7 to 12 μm for the following reasons. When the average diameter of the crystalline particles is not greater than 7 μm as shown by Sample Nos. 1 and 2, the resistivity at room temperature is undesirably not less than 3.5 Ωcm. In contrast, when the average diameter of the crystalline particles is not less than 12 μm as shown by Sample No. 8, the withstand voltage is undesirably not greater than 50 V/mm.

Example 2

Example 1 was repeated except for replacing $Sm_2O_3$ of the starting raw materials in Example 1 with $La_2O_3$, $Y_2O_3$, $Sb_2O_3$ or $Nb_2O_3$. In addition, variability of resistance was analyzed. The results are shown in Table 2.

As shown in Table 2, when $Sm_2O_3$ is used as the semiconductor-forming agent (Sample No. 21), the variability of the resistance is less than that of other semiconductor-forming agents (Sample Nos. 22, 24, and 25), except for $Y_2O_3$. When $Y_2O_3$ (Sample No. 23) is used as the semiconductor-forming agent, even though the variability of the resistance is suppressed, it is not preferable since the resistivity at room temperature is not less than 3.5 Ωcm.

TABLE 1

| | Content | | | | | | | Characteristic | | | |
|---|---|---|---|---|---|---|---|---|---|---|---|
| | Primary Component | | | | Semiconductor-Forming Agent | Additive | | Resistivity at Room | With-stand | Resistance-Temperature | Particle |
| Sample No. | $BaTiO_2$ (mol %) | $PbTiO_3$ (mol %) | $SrTiO_3$ (mol %) | $CaTiO_3$ (mol %) | $Sm_2O_3$ (mol %) | $MnO_2$ (mol %) | $SiO_2$ (mol %) | Temperature ρ25 (Ω · cm) | Voltage (V/mm) | Coefficient α (%/° C.) | Diameter (μm) |
| *1 | 60.0 | 10.0 | 15.0 | 15.0 | 0.2 | 0.02 | 1.0 | 4.4 | 100 | 9.6 | 5.5 |
| *2 | 60.0 | 10.0 | 15.0 | 15.0 | 0.2 | 0.02 | 1.0 | 4.0 | 90 | 10.0 | 6.4 |
| 3 | 60.0 | 10.0 | 15.0 | 15.0 | 0.2 | 0.02 | 1.0 | 3.5 | 85 | 9.9 | 7.0 |
| 4 | 60.0 | 10.0 | 15.0 | 15.0 | 0.2 | 0.02 | 1.0 | 3.3 | 80 | 10.4 | 8.1 |
| 5 | 60.0 | 10.0 | 15.0 | 15.0 | 0.2 | 0.02 | 1.0 | 2.3 | 70 | 10.5 | 9.5 |

TABLE 1-continued

| | Content | | | | | | | Characteristic | | | |
|---|---|---|---|---|---|---|---|---|---|---|---|
| | Primary Component | | | | Semiconductor-Forming Agent | Additive | | Resistivity at Room | With-stand | Resistance-Temperature | Particle |
| Sample No. | $BaTiO_2$ (mol %) | $PbTiO_3$ (mol %) | $SrTiO_3$ (mol %) | $CaTiO_3$ (mol %) | $Sm_2O_3$ (mol %) | $MnO_2$ (mol %) | $SiO_2$ (mol %) | Temperature ρ25 (Ω · cm) | Voltage (V/mm) | Coefficient α (%/° C.) | Diameter (μm) |
| 6 | 60.0 | 10.0 | 15.0 | 15.0 | 0.2 | 0.02 | 1.0 | 2.0 | 60 | 10.6 | 10.6 |
| 7 | 60.0 | 10.0 | 15.0 | 15.0 | 0.2 | 0.02 | 1.0 | 1.7 | 55 | 10.9 | 11.9 |
| *8 | 60.0 | 10.0 | 15.0 | 15.0 | 0.2 | 0.02 | 1.0 | 1.4 | 45 | 11.6 | 13.7 |
| 9 | 55.0 | 10.0 | 15.0 | 20.0 | 0.2 | 0.02 | 1.0 | 2.4 | 70 | 10.9 | 8.2 |
| 10 | 55.0 | 10.0 | 20.0 | 15.0 | 0.2 | 0.02 | 1.0 | 2.5 | 70 | 10.9 | 8.6 |
| 11 | 55.0 | 15.0 | 15.0 | 15.0 | 0.2 | 0.02 | 1.0 | 2.3 | 75 | 11.0 | 8.2 |
| 12 | 65.0 | 5.0 | 15.0 | 15.0 | 0.2 | 0.02 | 1.0 | 2.0 | 65 | 10.0 | 10.6 |
| 13 | 65.0 | 10.0 | 10.0 | 15.0 | 0.2 | 0.02 | 1.0 | 2.1 | 65 | 10.1 | 10.8 |
| 14 | 65.0 | 10.0 | 15.0 | 10.0 | 0.2 | 0.02 | 1.0 | 2.1 | 65 | 10.1 | 10.6 |
| 15 | 60.0 | 10.0 | 15.0 | 15.0 | 0.1 | 0.02 | 1.0 | 2.1 | 85 | 11.9 | 11.0 |
| 16 | 60.0 | 10.0 | 15.0 | 15.0 | 0.3 | 0.02 | 1.0 | 2.3 | 65 | 9.3 | 8.6 |
| 17 | 60.0 | 10.0 | 15.0 | 15.0 | 0.2 | 0.01 | 1.0 | 1.6 | 60 | 9.2 | 10.2 |
| 18 | 60.0 | 10.0 | 15.0 | 15.0 | 0.2 | 0.03 | 1.0 | 3.1 | 85 | 12.0 | 8.8 |

TABLE 2

| | Content | | | | | | | | Characteristic | | | | |
|---|---|---|---|---|---|---|---|---|---|---|---|---|---|
| | Primary Component | | | | Semiconductor-Forming Agent | | Additive | | Resistivity at Room | With-stand | Resistance-Temperature | Particle | Variability |
| Sample No. | $BaTiO_2$ (mol %) | $PbTiO_3$ (mol %) | $SrTiO_3$ (mol %) | $CaTiO_3$ (mol %) | Type of Oxide | Amount (mol %) | $MnO_2$ (mol %) | $SiO_2$ (mol %) | Temperature ρ25 (Ω · cm) | Voltage (V/mm) | Coefficient α (%/° C.) | Diameter (μm) | of Resistance (CV %) |
| 21 | 60.0 | 10.0 | 15.0 | 15.0 | $Sm_2O_3$ | 0.20 | 0.02 | 1.0 | 2.8 | 70.0 | 10.5 | 9.5 | 3.2 |
| *22 | 60.0 | 10.0 | 15.0 | 15.0 | $La_2O_3$ | 0.20 | 0.02 | 1.0 | 2.1 | 65.0 | 10.0 | 10.0 | 6.3 |
| *23 | 60.0 | 10.0 | 15.0 | 15.0 | $Y_2O_3$ | 0.25 | 0.02 | 1.0 | 4.0 | 80.0 | 12.0 | 8.0 | 3.1 |
| *24 | 60.0 | 10.0 | 15.0 | 15.0 | $Sb_2O_3$ | 0.20 | 0.02 | 1.0 | 2.0 | 60.0 | 9.5 | 8.8 | 6.5 |
| *25 | 60.0 | 10.0 | 15.0 | 15.0 | $Nb_2O_3$ | 0.20 | 0.02 | 1.0 | 2.2 | 60.0 | 9.5 | 9.0 | 6.2 |

Various changes and modifications can be made without departing from the spirit and scope of this invention. The various embodiments set forth herein were intended to illustrate the invention but not to limit it.

What is claimed is:

1. A semiconductor ceramic comprising a primary component of barium titanate, lead titanate, strontium titanate and calcium titanate, and containing a semiconductor-forming agent,
   wherein the semiconductor-forming agent is samarium oxide and the average diameter of crystalline particles of the semiconductor ceramic is about 7 to 12 μm.

2. A semiconductor ceramic according to claim 1, wherein the primary component comprises about 30 to 97 mol percent of barium titanate, about 1 to 50 mol percent of lead titanate, about 1 to 30 mol percent of strontium titanate and about 1 to 25 mol percent of calcium titanate, the total of said titanates being 100 mol percent.

3. A semiconductor ceramic according to claim 2, wherein the Sm oxide is in an amount of about 0.1 to 0.3 mol elemental Sm on the basis of 100 mols of the primary component.

4. A semiconductor ceramic according to claim 3, further comprising a Mn-containing additive in an amount of about 0.01 to 0.03 mol elemental Mn on the basis of 100 mols of the primary component.

5. A semiconductor ceramic according to claim 4, further comprising a Si-containing in an amount of about 0 to about 2.0 mol elemental Si on the basis of 100 mols of the primary component.

6. A semiconductor ceramic according to claim 2, wherein the Sm oxide is $Sm_2O_3$.

7. A semiconductor ceramic according to claim 1, wherein the Sm oxide is in an amount of about 0.1 to 0.3 mol elemental Sm on the basis of 100 mols of the primary component.

8. A semiconductor ceramic according to claim 1, further comprising a Mn-containing additive in an amount of about 0.01 to 0.03 mol elemental Mn on the basis of 100 mols of the primary component.

9. A semiconductor ceramic according to claim 1, further comprising a Si-containing in an amount of about 0 to about 2.0 mol elemental Si on the basis of 100 mols of the primary component.

10. A semiconductor ceramic device having electrodes on two surfaces of a semiconductor ceramic according to claim 9.

11. A semiconductor ceramic device having electrodes on two surfaces of a semiconductor ceramic according to claim 8.

12. A semiconductor ceramic device having electrodes on two surfaces of a semiconductor ceramic according to claim 7.

13. A semiconductor ceramic device having electrodes on two surfaces of a semiconductor ceramic according to claim 6.

14. A semiconductor ceramic device having electrodes on two surfaces of a semiconductor ceramic according to claim 5.

15. A semiconductor ceramic device having electrodes on two surfaces of a semiconductor ceramic according to claim 4.

16. A semiconductor ceramic device having electrodes on two surfaces of a semiconductor ceramic according to claim 3.

17. A semiconductor ceramic device having electrodes on two surfaces of a semiconductor ceramic according to claim 2.

18. A semiconductor ceramic device having electrodes on two surfaces of a semiconductor ceramic according to claim 1.

19. A semiconductor ceramic according to claim 1, which is a sintered and reoxidized semiconductor ceramic.

20. A semiconductor ceramic according to claim 1, obtained by sintering in a nitrogen atmosphere and reoxidation thereafter.

* * * * *